United States Patent [19]

Cousineau

[11] Patent Number: 5,278,773
[45] Date of Patent: Jan. 11, 1994

[54] CONTROL SYSTEMS FOR CONTROLLING A WIND TURBINE

[75] Inventor: Kevin L. Cousineau, Tehachapi, Calif.

[73] Assignee: Zond Systems Inc., Tehachapi, Calif.

[21] Appl. No.: 579,676

[22] Filed: Sep. 10, 1990

[51] Int. Cl.⁵ .............................................. G06F 15/20
[52] U.S. Cl. ..................................... 364/494; 364/492; 416/36
[58] Field of Search ............... 364/494, 492, 131, 133; 73/189; 416/36, 61, 197; 290/44

[56] References Cited

U.S. PATENT DOCUMENTS

| | | | |
|---|---|---|---|
| 3,452,593 | 7/1969 | Lauter, Jr. | 364/510 |
| 4,153,198 | 5/1979 | Eki et al. | 364/494 |
| 4,155,252 | 5/1979 | Morrill | 364/492 |
| 4,365,929 | 12/1982 | Retz | 416/197 A |
| 4,410,806 | 10/1983 | Brulle | 416/36 |
| 4,413,319 | 11/1983 | Schultz et al. | 364/131 |
| 4,435,647 | 3/1984 | Harner et al. | 290/44 |
| 4,535,252 | 8/1985 | Jacobs et al. | 290/44 |
| 4,700,081 | 10/1987 | Kos et al. | 290/44 |
| 4,858,101 | 8/1989 | Stewart et al. | 364/131 |
| 4,916,600 | 4/1990 | Ropelato | 364/131 |

Primary Examiner—Jack B. Harvey
Assistant Examiner—Ellis B. Ramirez
Attorney, Agent, or Firm—Cushman, Darby & Cushman

[57] ABSTRACT

A distributed module control system for controlling a wind turbine using multiple controls and monitors comprising multiple modules that include microcontrollers, and having data input terminals and data output terminals; high level logic circuitry interconnecting the modules via selected data input and data output terminals; and certain modules also connected with the turbine monitors and controls to control operation of the wind turbines in response to monitoring of turbine operation.

8 Claims, 5 Drawing Sheets

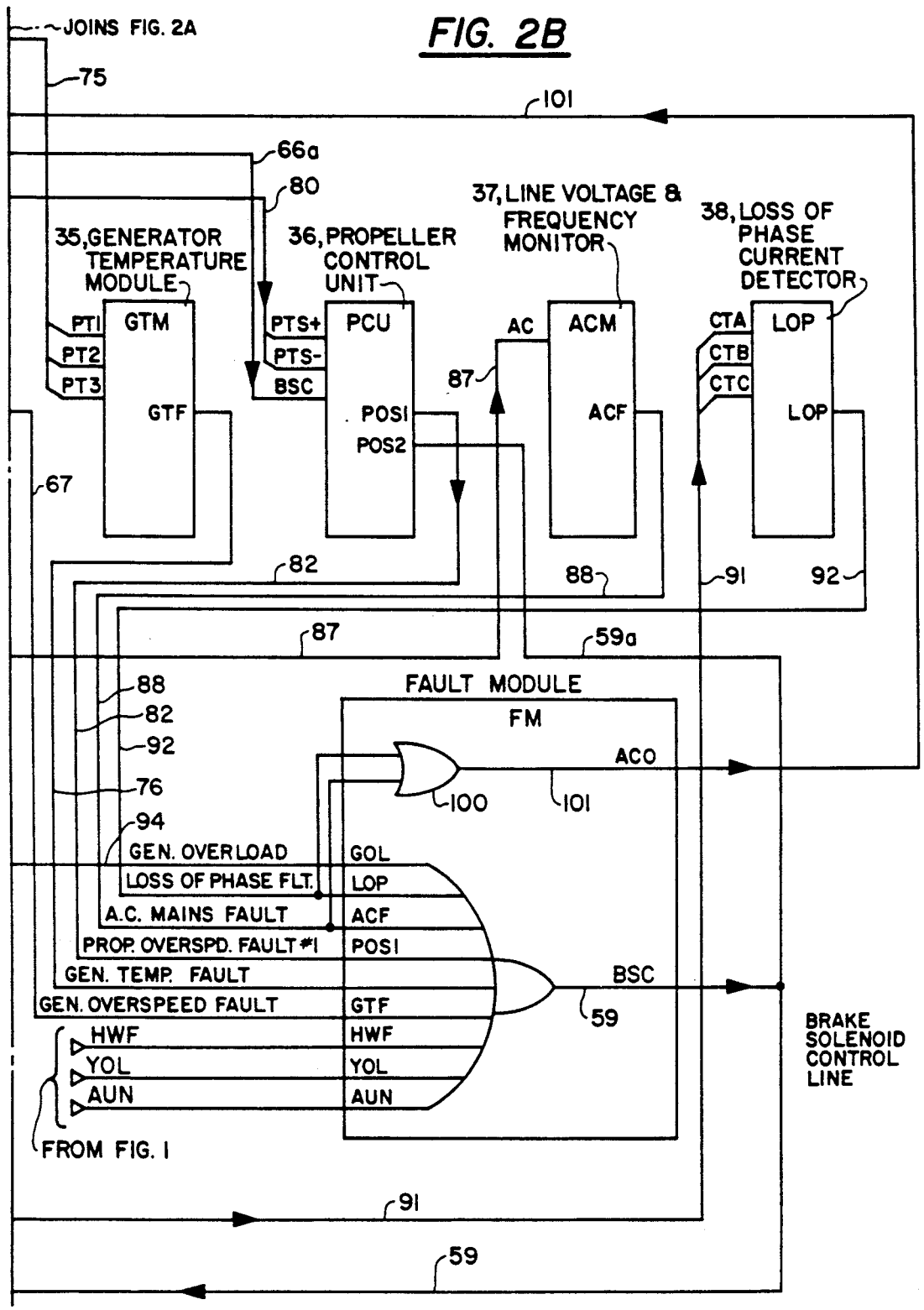

CONTROL SYSTEMS FOR CONTROLLING A WIND TURBINE

BACKGROUND OF THE INVENTION

This invention relates generally to control systems that employ distributed data (intelligence) processing, and more particularly to wind turbine control systems wherein multiple microprocessors are employed instead of a central processor.

Historically, microprocessor based wind turbine control systems have been designed, developed and manufactured using a single central processing unit which handles all input, output, calculation, logic, and data manipulation functions. Such centralized processing requires multiplexed input/output functions and relatively large interrupt driven programs to handle the complexity of wind turbine control. This design approach has certain objectionable aspects due to the following reasons:

1. The processors' inability to monitor and control each input/output port simultaneously. Although some real time data can be processed, the large input/output requirements mean that most functions will be allocated on a shared priority basis.

2. Because of the turbine controller's large requirements for input/output data, peripheral integrated circuits are required to expand the functional ability of the processor. These peripheral circuits increase the complexity of the central processing unit design, decreasing its long term reliability and increasing its maintenance cost.

3. Such complex centralized designs also require relatively large programs, which are much more difficult and time consuming to analyze, test and debug. Software development time can easily outstrip hardware development time in such large programs, and therefore project management can be complicated due to problems associated with judging the time required for such programming.

4. Traditionally, the manufacturing method for such centralized design has been to locate all of the electronic components on a single printed circuit board making maintenance cumbersome, time consuming, and relatively expensive.

A typical centralized processor employs an address and data bus to expand the functional ability of the processor through such external integrated circuits, such as a Peripheral Interface Adapter (PIA), External Random Access Memory, special timing circuits, serial port adapters, and Analog to Digital Conversion. In addition, most processor based control systems used in wind turbine controller environments require external Read Only Memory for the program residence. In a typical wind turbine application, the program residence can occupy as many as three or four ROM chips. External Random Access Memory for data storage and manipulation can also occupy several chips, and it is not uncommon to see two or three PIA chips in order for the processor to deal with the large input/output requirements of the control system. Other external peripheral integrated circuits can include special timer chips, and serial port adapters. As the number of these chips grows, so does the control bus logic, thereby increasing the complexity of the design.

SUMMARY OF THE INVENTION

It is a major object of the invention to provide a distributed intelligence control system, particularly suitable for wind turbine control, that overcomes the above described problems and disadvantages.

As will appear, the invention basically includes:

a) multiple modules that each include a microcontroller, and having data input terminals and data output terminals, b) high level logic circuitry interconnecting the modules via selected data input and data output terminals, and c) certain modules also connected with the turbine monitors and controls to control operation of the wind turbine in response to monitoring of turbine operation.

The microcontrollers employed differ from a microprocessor primarily because the functions required for operation as an instrument or controller are integrated onto one chip. This does not mean that microcontrollers normally outperform microprocessors; on the contrary, most microcontrollers have a simpler instruction set and are more difficult to expand since their address and data bus is normally not readily available at the output pins. However, since the present control system is divided up into only a few small individual blocks, the microcontrollers can easily handle their duties without the use of other peripheral integrated circuits, with the possible exception of an analog to digital converter.

In the inter-module and input/output communication system employed, communication between modules, external sensors, switches and indicators is accomplished with the use of high voltage, (high level) logic signals. Such high level logic helps achieve good noise immunity, especially since many of these signals must travel up the turbine tower in parallel with motor and generator power cables.

Each microcontroller is operated asynchronously, in that each has its own internal clock and is not synchronized with the previous device. Such a system can be accomplished with good definitions of the individual blocks provided. Each is completed with only input and output lines necessary for operation. This is advantageously achieved within a wind turbine control system because of the unique and individual duties necessary, such as generator mains control, propeller overspeed monitoring and control, AC mains voltage and frequency monitoring, yaw system control, wind speed monitoring and control signaling, cable twist monitoring and control signaling, and other individual functions.

Advantages of the present de-centralized distributed intelligence approach include:

1. The system can be easily modularized for easy maintenance, by packaging the microcontrollers in small individual modules that can be plugged in and out of a mother board. Also modularized are the display, control and fault display modules so that maintenance can be achieved by simple module replacement Since each module is small and inexpensive, maintenance is greatly simplified. Finally, the expense of replacing an entire centralized control system circuit board, in the event of malfunction, is avoided by replacing a much simpler single module.

2. Since individual control functions have associated microcontrollers, and these functions can be and are monitored on a more continuous basis than in a centralized processor design. Instead of one processor scanning each function, multiple processors scan the same number of inputs and outputs, thereby increasing the speed of algorithm completion.

3. Software requirements are greatly simplified. Each module contains an assembled machine code program as small as 1000 bytes, and typically no larger than 2000 bytes. The total program space required for all of the modules is smaller than with a centralized approach, which requires programs exceeding 16 to 32 kilobytes in size. This reduction greatly reduces the time required for programming and especially debugging of the completed program.

4. Since each microcontroller is a complete system in itself, hardware cost is reduced by the reduction in the number of peripheral integrated circuits required. The control system achieves a 40% reduction in actual integrated circuits over a centralized processor system.

Besides these advantages, the following design objectives are achieved, greatly enhancing system reliability:

1. Control of wind turbine performance in relative extreme environmental conditions, such as ambient temperatures between −25 to +85 degrees C., including 100% humidity and a condensing atmosphere. Extended temperature range components and a military grade conformal coating for the circuit boards can be employed. This allows operation of the controller in cold, hot and moist environments, without the expense of an outboard controller heater and its associated control system. Start-up of the controller can be obtained during extremely cold, hot or moist conditions.

2. By employing only MOS, HCMOS and high voltage bipolar integrated circuits, a higher level of noise immunity can be achieved, as compared with conventional LSTTL and TTL integrated circuits.

3. Grounding and shielding, to achieve lower noise operation, includes single point grounding for each module, the mother board and finally th entire controller system. Telescoping shields and optical insulated control lines are also used to help reduce noise and increase common mode noise rejection. Also employed are bypassing of each integrated circuit as well as over-voltage protection zener diodes and metal oxide varistors. These components help to interface microcontrollers directly with control signals, without need for or use of buffers.

A distributed power supply system is employed by using a standard 28 volt regulated supply for main system bus power and distributing it to each module, which in turn employ their own 5, 12, and 15 volt regulators, internally.

4. Inductive snubbers and other transient overvoltage protection are employed where solenoid, lamp, and coils are controlled and operated.

5. Logic control of important functions, such as generator mains connection and overspeed control, to avoid disconnect of the generator from the mains upon a fault, and a consequent overspeed condition of the rotor during high wind speeds.

These and other objects and advantages of the invention, as well as the details of an illustrative embodiment, will be more fully understood from the following specification and drawings, in which:

DRAWING DESCRIPTION

FIGS. 1A nd 1B illustrate a control circuit diagram;
FIGS. 2*a* and 2*b* also show a control circuit diagram;
FIG. 3 is a circuit diagram showing module-to-module signalling;
FIG. 4 is a block diagram; and
FIG. 5 is a module mounting means.

DETAILED DESCRIPTION

Figure 1A:
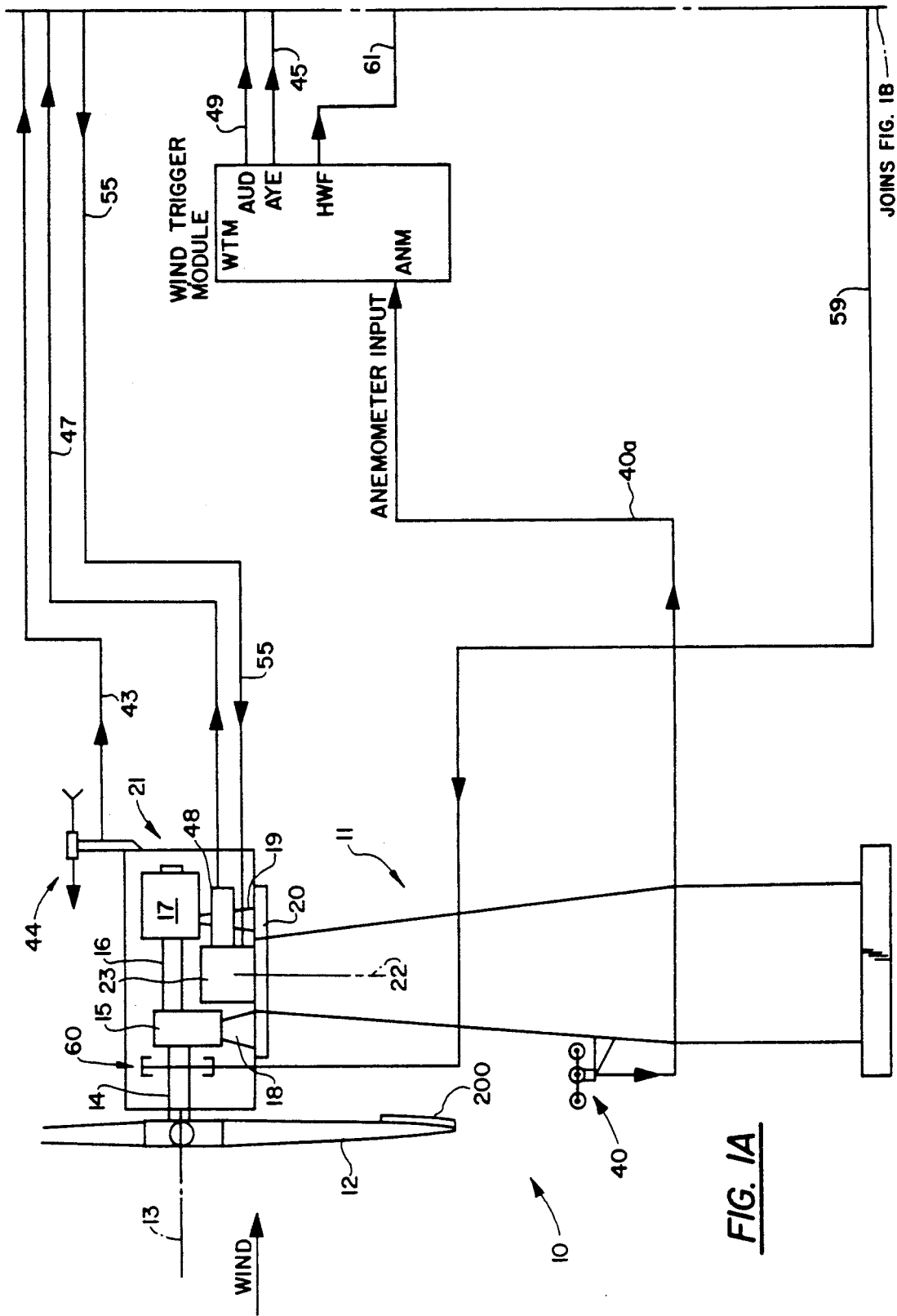
Figure 1B:
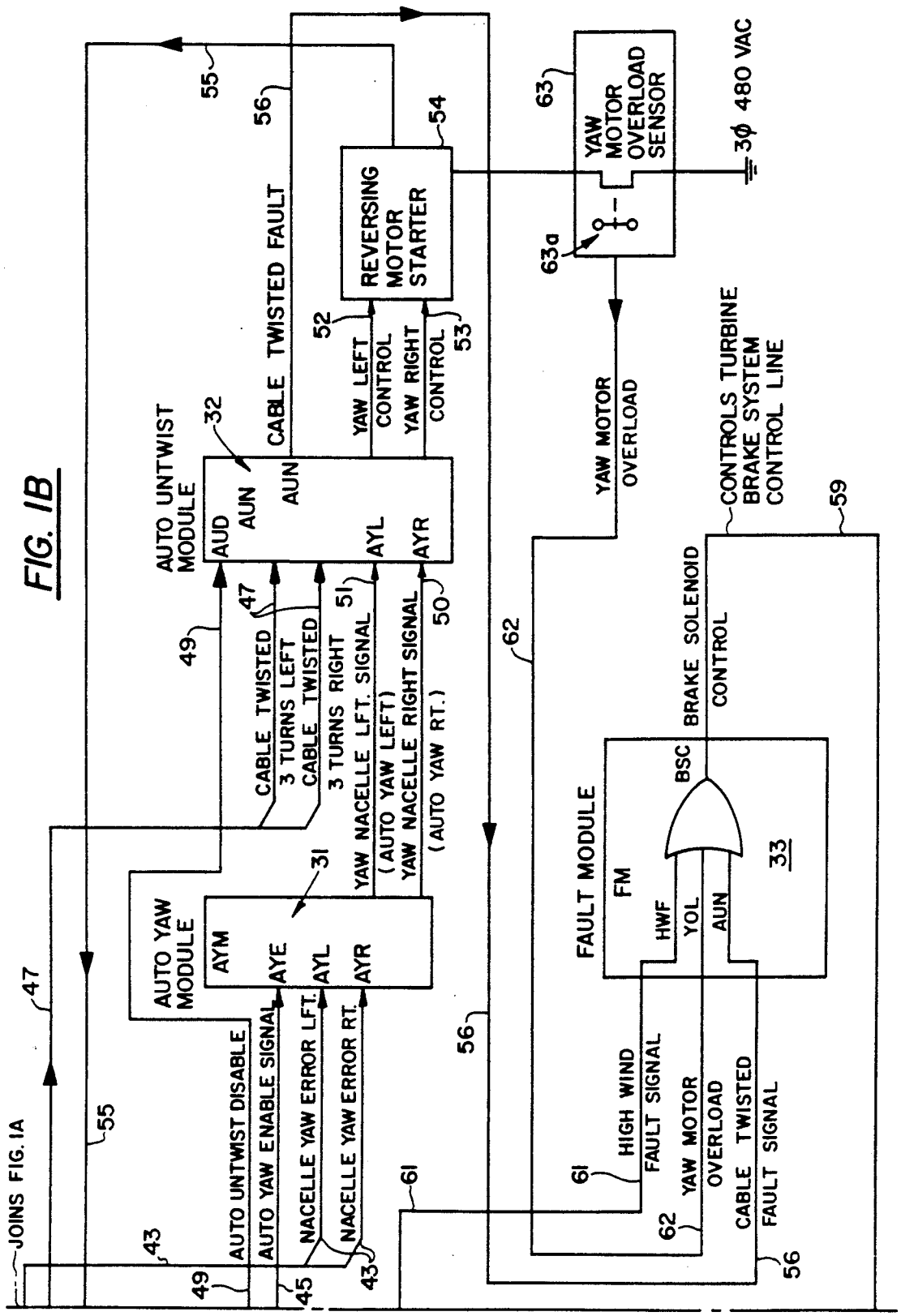

In FIG. 1*a*, a wind turbine 10 is mounted on a tower 11. It may for example include three blades 12, defining a 19 meter diameter blade tip rotary trajectory, about a horizontal axis 13. These are examples only. The propeller shaft (low speed) 14 is connected with gearing in a gear box 15, which is in turn connected via a shaft 16 to an electrical generator represented at 17. These elements may be suitably carried at 18 and 19 on a platform 20 on the tower. Nacelle 21 encloses these elements, as shown. Platform 20 is rotatable about a vertical axis 22, as by a yaw motor 23.

Figure 2A:
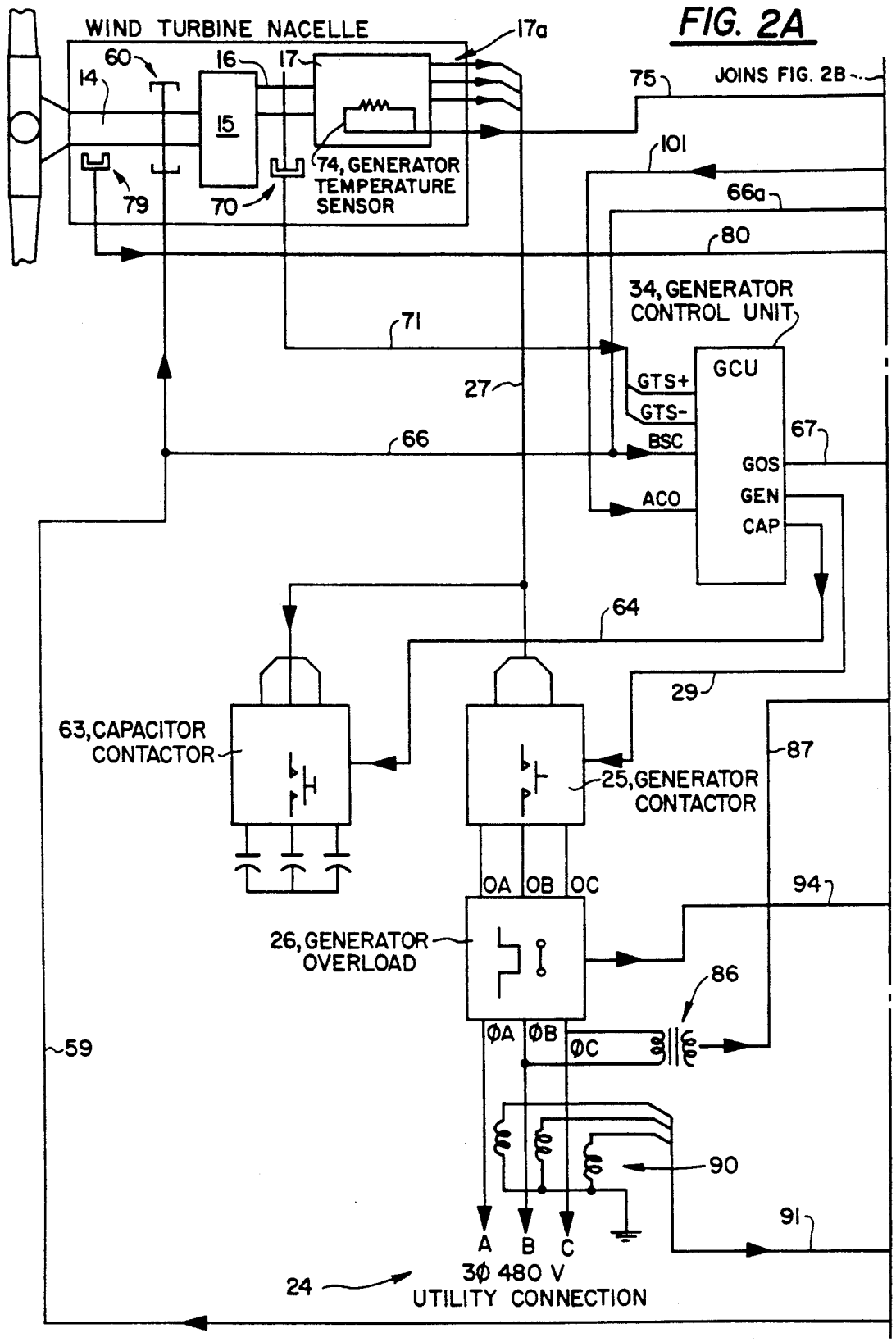

As seen in FIG. 2*a*, the generator output at 17*a* is electrically connected with a three-phase 480 volt utility connection, at 24, as through generator contactor and generator overload connections 25 and 26.

Eight distributed intelligence control modules are shown in FIGS. 1*a*, 1*b*, 2*a*, and 2*b*. They may be supplied on corresponding self-contained circuit boards, and are identified and described as follows:

30 Wind Trigger Module (WTM) which provides wind speed control signals for the automatic yawing system, automatic cable untwisting system, and high wind speed turbine control shutdown from a tower mounted anemometer 40, connected at 40*a* to 30.

31 Auto Yaw Module (AYM) which provides or controls yawing function, via leads 50 and 51 to the module 32, in response to error signals provided by the output on leads 43 from the nacelle mounted wind vane sensor 44. This negative feedback-type control maintains the propeller axis aligned with the wind direction. An auto yaw enable signal is applied at 45 from the WTM, 32 Auto Untwist Module (AUM), which provides or controls cable untwisting, functions through a yaw motor mounted sensor. See input leads 47 from the twist counter 48 that senses twist or rotation of the platform 20 and nacelle about axis 22. An auto twist disable signal is applied at 49 to 32 from the WTM. Also, yaw (nacelle) right and left signals are applied from the AYM, via leads 50 and 51; and outputs at 52 and 53 control a reversing motor starter 54 connected at 55 with the yaw motor 23. Cable twisted fault output at 56 is connected with a fault module 33 (see below).

33 Fault Module (FM) provides non-volatile latching fault memory and display status indications, i.e., control of the wind turbine brake system. See FM output lead (or leads) 59 connected with a shaft brake (solenoid and actuator) 60 at the turbine. The other inputs to the FM include high wind fault input lead 61 from the WTM and yaw motor overload input lead 62 from yaw motor overload sensor 63. (Switch 63*a* at 63 opens in the event of yaw motor overload, signaling the FM.)

Further, as seen in FIG. 2*b*, additional inputs to the FM will be referred to in connection with additional distributed intelligence control modules to be described. The FM output brakes the shaft 14, in response to any fault input to the FM.

34 (See FIG. 2*a*) Generator control unit (GCU) provides control of the output of generator 17, as through the generator contactor (see lead 29), and the power factor controlling capacitor contactor unit 63 (see lead 64). Unit 63 operates in the same manner as the mains generator contactor, except during the condition of a failure in the AC mains connection, such as under or over voltage, under or over frequency, or loss of phase, in which case this contactor will be disabled. During these fault conditions, the generator control unit is signaled by the ACO line 101 which is the "ORed" output, from 100, (see FIG. 2b) of both the ACF (AC mains fault) and LOP (Loss of Phase fault) signal lines 88 and 92.

The generator control unit also monitors, as via input lead 66, the wind turbine brake solenoid control line (BSC) to determine proper status of its signaling, to prevent the generator from operating as a motor against the brake, and to signal an operator in case of a tachometer sensor failure.

The last function of the generator control unit is to provide a generator overspeed output fault signal on lead 67 to the fault module.

Generator overspeed is signaled from a tachometer sensor 70, on lead 71, to the generator control unit.

35 The generator temperature module (GTM) monitors, via sensor 74 and lead 75, the temperature of the generator, and when it has exceeded a preset temperature for a fixed period of time, will in turn signal the fault module of an over-temperature condition. See lead 76.

36 The propeller control unit (PCU) responds to low speed shaft 14 RPM, as via sensor 29 and lead 80, and to signals on brake speed control (BSC) line 66 (see lead 66a): and provides two control outputs, at terminals Propeller Overspeed #1 (POS1) and Propeller Overspeed #2 (POS2). See lead 82 from POS1 to the fault module, and lead 59a to lead 59 to the turbine brake.

Propeller Overspeed #1 occurs at a lower RPM value then #2. If an overspeed condition should occur, propeller overspeed #1 will signal the brake 60 through the fault module to actuate and bring the turbine to a stop. By monitoring both RPM and the BSC line, this module will provide output Propeller Overspeed #2, if the turbine fails to come to a stop, or continues to accelerate. Propeller Overspeed #2 signals the brake via line 59a to release allowing the turbine to continue to accelerate to a point where the propeller overspeed tip-flaps 200 will deploy. These fail-safe devices will prevent the destruction of the turbine. The activation of Propeller Overspeed #2 will also prevent the brake system from failing.

37 The AC mains module (line voltage and frequency monitor) monitors the utility grid, as via the potential transformer 86 and lead 87. It provides an AC mains fault output (ACF) on lead 88 to the fault monitor, when the utility grid frequency exceeds utility standards for frequency and voltage for utility standards of time.

38 The loss of phase (LOP) monitor senses at 90 and 91 the three-phase currents being produced or consumed by the turbine and control system, and signals a loss of a single phase. Monitoring of current is required due to the fact that induction generators will produce voltage on a broken leg due to self excitation caused by the power factor capacitors.

It is also noted that the fault module FM receives an input on lead 94 from the generator overload connection 26. All of the inputs to the FM are processed, so as to produce a turbine braking signal or signals on lead 59, actuating the brake in case of a sensed fault, as described. Note also a feedback loop at 100 and 101 to the GCU.

Figure 3:
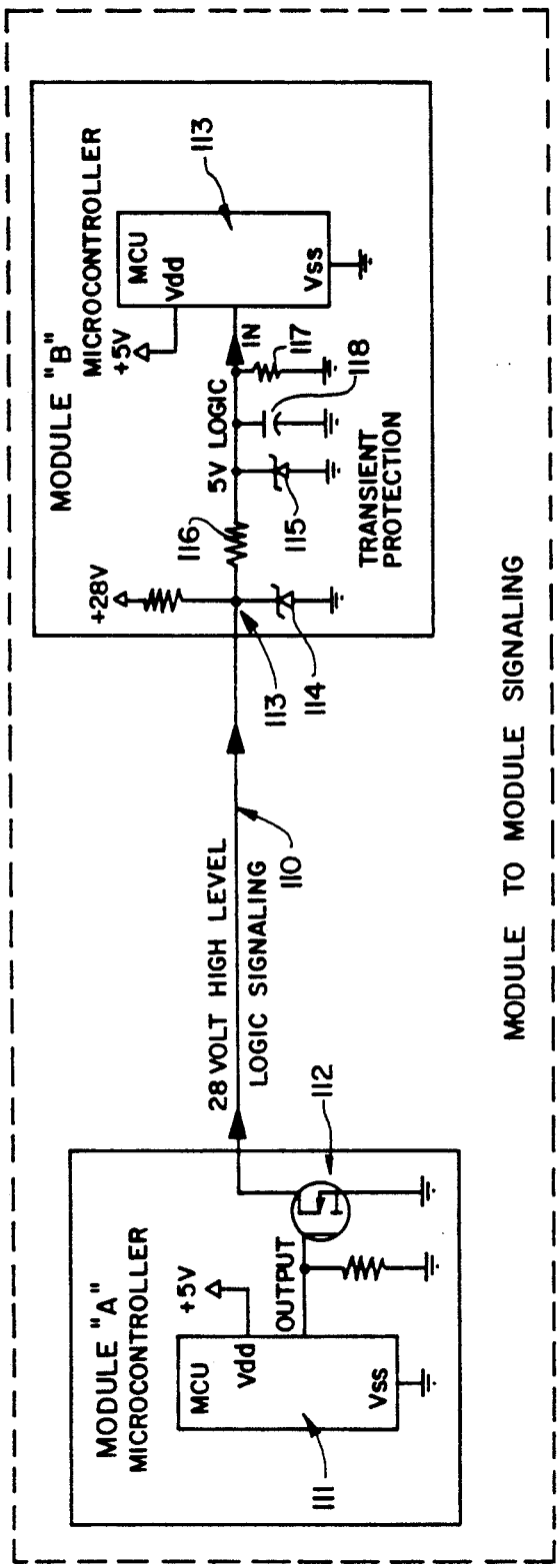

FIG. 3 illustrates module-to-module signaling technique, as employed in the inter-module connection described Note the use of 28 volt high-level logic signaling at 110, as between MCO (microcontroller) 111 and transistor 112 to the input at 113 to MCO 113. Transient protection and 5 volt logic are provided by the diodes, resistors, and capacitor, as seen at 114-118 shown, whereby the microcontrollers operate at low voltage levels, as for example 5 volts.

Figure 4:
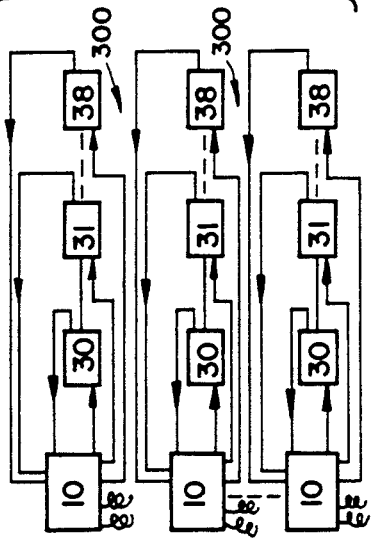

FIG. 4 illustrates multiple wind turbines 10 and their monitoring and control systems. See multiple modules 30, 31-38 associated with each turbine, and feedback controls, indicated at 300, from the modules. Such modules and controls may be considered to include fault monitors, as at 33, as well as additional circuitry, as referred to.

Figure 5:
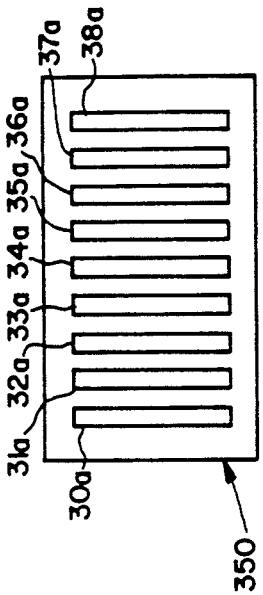

The circuitry, as described, for each turbine may be carried at or proximate the tower for each turbine; and the modules 30-38 are separate and discrete, and have individually replaceable circuit boards. See FIG. 5, with side-by-side boards 30a-38a mounted in a chassis 350.

SUMMARY

Traditional wind turbine control systems have been based on a centralized processing system where one microprocessor is called upon to monitor, signal and control the entire input/output system of the turbine. This type of control system suffers from intensive hardware/software requirements, and large and complex multiplexed input/output monitoring. By decentralizing the processor power and distributing this intelligence into several small, defined modules employing several individual microcontrollers, as at 30-38, a higher performance system that is less software intensive, requires less parts, is more reliable, and is much easier to troubleshoot is achieved.

I claim:

1. In a distributed module control system for controlling a wind turbine using multiple controllers and monitors, including turbine monitors, the combination comprising
   a) multiple modules that include microcontrollers, and having data input terminals and data output terminals,
   b) high level logic circuitry interconnecting the modules via selected data input and data output terminals, and
   c) certain modules also connected with said turbine monitors and controllers to control operation of the wind turbine in response to monitoring of turbine operation.

2. The system of claim 1 wherein said turbine monitors and controllers include:
   a turbine driven generator control
   a propeller overspeed monitor and control
   an AC mains voltage and frequency monitor
   a turbine yaw system control
   a wind speed monitor and control
   a cable twist monitor and control.

3. The system of claim 1 wherein the system includes multiple wind turbines, and multiple of said elements a), b) and c).

4. The system of claim 1 wherein said circuitry interconnecting said modules includes circuit components connecting between low internal voltage logic in each microcontroller and high signalling voltage logic paths between microcontrollers.

5. The system of claim 1 wherein said modules include:
- i) a wind speed module connected to acquire output data from a wind turbine tower mounted anemometer and to provide wind speed digital data,
- ii) an auto yaw module connected to acquire output data from a turbine nacelle mounted wind vane sensing nacelle direction relative to prevailing wind direction, and to provide error data,
- iii) an auto untwist module connected to respond to said error data and to control the turbine yaw motor.

6. The system of claim 5 wherein the auto untwist module is also connected to be responsive to twist state of a turbine platform to control the turbine yaw motor.

7. The system of claim 1 wherein the modules include a fault module for controlling a turbine brake, and at lest three of the following modules:
- i) a wind trigger module responsive to input from an anemometer at a tower mounting the turbine for signaling the fault module;
- ii) a yaw module responsive to a prevailing wind direction signal to control a turbine yaw motor for rotating a turbine platform to maintain turbine propeller alignment with wind direction;
- iii) an auto untwist module responsive to twisting of a turbine mounting platform to signal the fault module;
- iv) a generator control circuit responsive to turbine speed to signal an overspeed condition to the fault module;
- v) a generator temperature module responsive to generator temperature to signal said fault module;
- vi) a propeller control unit responsive to turbine speed to signal said fault module;
- vii) a line voltage and frequency module responsive to monitored line voltage and frequency to signal said fault module; and
- viii) a loss of phase module responsive to monitored phase of a three-phase mains system to signal the fault monitor in the event of phase loss.

8. The system of claim 7 wherein said modules are separate and discrete, and have individually replaceable circuit boards.

* * * * *